No. 752,370. PATENTED FEB. 16, 1904.
P. H. A. BALSLEY.
FLOWER POT.
APPLICATION FILED SEPT. 6, 1902.

NO MODEL. 2 SHEETS—SHEET 2.

WITNESSES.
L. E. Flanders
T. G. Longstaff

INVENTOR.
Philip H. A. Balsley
By
Attorneys.

No. 752,370.　　　　　　　　　　　　Patented February 16, 1904.

UNITED STATES PATENT OFFICE.

PHILIP H. A. BALSLEY, OF DETROIT, MICHIGAN.

FLOWER-POT.

SPECIFICATION forming part of Letters Patent No. 752,370, dated February 16, 1904.

Application filed September 6, 1902. Serial No. 122,375. (No model.)

*To all whom it may concern:*

Be it known that I, PHILIP H. A. BALSLEY, a citizen of the United States of America, residing at Detroit, in the county of Wayne and State of Michigan, have invented certain new and useful Improvements in Flower-Pots, of which the following is a specification, reference being had therein to the accompanying drawings.

This invention relates more particularly to flower-pots specifically intended for propagating purposes and for which purpose at present diminutive flower-pots of the common kind made of clay are used.

Figure 1:
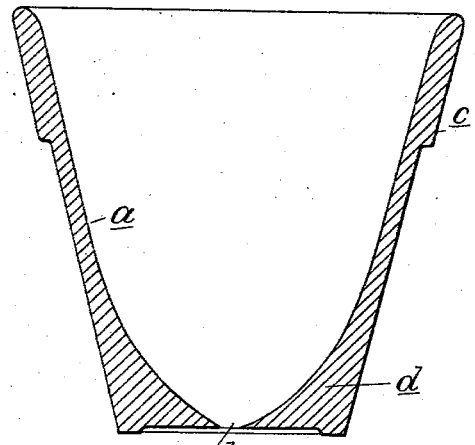
Figure 3:
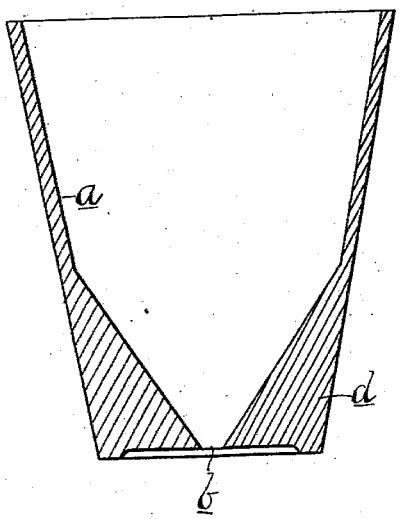
Figure 4:
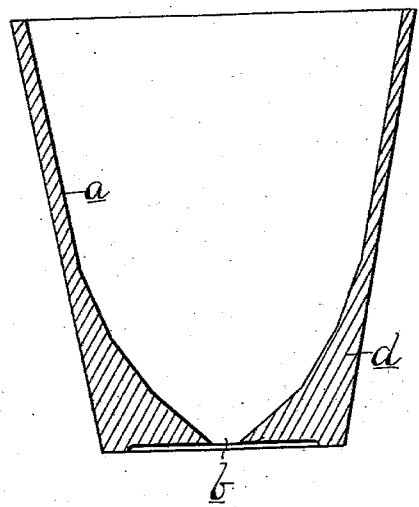

In propagating plants the cuttings are planted into these little pots and placed upon benches close together in sand, moss, or other suitable material to keep the pots moist, and after a certain root development they are transplanted into larger pots, often more than once. In thus repotting the growing young plants some which have developed faster than others will have become so root-bound in the pots that it is difficult to take them out, and a considerable percentage of the plants or of the pots are injured in the operation. Besides any violent removal will break up the ball of earth around the roots and check the growth of the plant. Further, the ordinary shape of pot known to everybody does not give the desired ball-shaped development to the root growth, but rather compels the plant into an abnormal root growth. To this end I have devised an improved flower-pot especially adapted for propagating purposes in that it favors an increased root growth of ball shape and does away with the loss of plants or pots arising from the above-mentioned and other causes, all as more fully hereinafter described in connection with the drawings, in which my improved propagating-pot is shown in vertical central section in Figure 1, Fig. 2 being a similar view of a modified form. Figs. 3 and 4 are similar views of other modifications.

My improved propagating-pot is made of clay in the usual manner and has the same general outline as those in present use. The inner face of the wall, however, instead of being in parallelism with the outer face, as in the present pot, is differently formed in that beginning at the point *a* some distance below the upper edge it converges inwardly toward the drainage-hole *b* in the center of the bottom of the pot, thereby making the interior of the pot rounded at the bottom, while the outer face forms the usual frustum of a cone with or without the usual rim portion *c* around the mouth of the pot. In thus shaping the pot a thickened portion *d* is formed around the bottom portion of the pot, which is entirely wanting in the present form of pot. It will also be seen that the drainage-hole is without a vertical wall.

Experience with my improved propagating-pot has demonstrated that as the plant becomes root-bound it virtually crowds itself out of the pot, and thus the raised appearance of the plant in the pot itself is an indication of its condition, which calls for transplanting into a larger pot. Further, the plant, no matter how root-bound it may be, comes out readily and in perfect shape without any hard knocking of the pot or pulling on the plant, and when it comes out the roots form a ball. Further, the development of the roots of the plant takes place preferably at the bottom, and they form a complete network at the bottom owing to the more favorable distribution of the moisture by the thickened portion *d*, into which the moisture is absorbed and held in reserve to prevent the quick drying of the pot by loss of moisture. The formation of a drainage-hole without any vertical walls has also some advantage by bringing the soil in the pot in direct contact with the bench-soil without possibility of an air-space being formed in the drainage-hole, as is often the case with the drainage-hole in the ordinary pot.

My improved propagating-pot does not cost any more to manufacture than the present pot, and aside from all other advantages set out above it makes a more durable pot in that the bottom is not as liable to crack off as that of the ordinary pot, which is made rather thin at the bottom.

It is obvious that while I show in the drawings the inner lines from *a* to *b* curved, so as to make a spherically-contracted pot, they may be straight lines, as shown in Fig. 3, or composed of a series of straight lines, as shown in Fig. 4, so as to make the bottom conically contracted, and all such modifications are with the scope of my invention.

Figure 2:
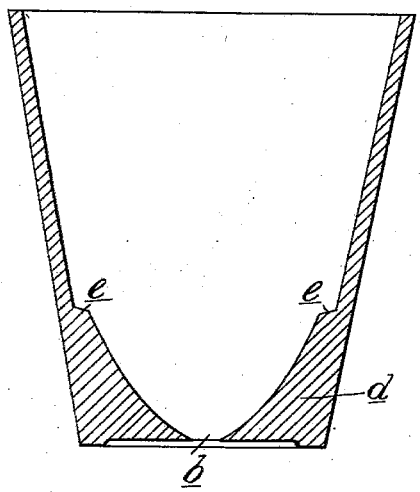

In the modification in Fig. 2 I omit the rim portion c on top of the pot and form a resting-shoulder e upon the inner wall at the junction between the two differently-tapering portions. Such a shoulder may be made without detriment to the objects of my invention, and it makes the pot a little lighter.

Having thus fully described my invention, what I claim is—

1. A flower-pot integrally formed of clay and having a substantially flat bottom with a central drainage-hole and a conically-tapering side wall the inner face of which near the bottom has a greater taper than that of the corresponding outer face and forms a direct junction with the drainage-hole by the inner and outer face intersecting with each other.

2. As a new article of manufacture, a flower-pot for propagating purposes made integrally of clay with a flat bottom and a conically-tapering side wall of substantially uniform thickness in the upper portion and progressively increasing in thickness in the lower portion toward the bottom whereby the inner face of the side wall has a correspondingly-increasing taper toward the bottom, said inner face and the outer face of the bottom intersecting with each other and forming a central drainage-hole.

In testimony whereof I affix my signature in presence of two witnesses.

PHILIP H. A. BALSLEY.

Witnesses:
   OTTO F. BARTHEL,
   THOMAS G. LONGSTAFF.